United States Patent
Mitsunobu et al.

(10) Patent No.: US 12,503,755 B2
(45) Date of Patent: Dec. 23, 2025

(54) PLATED STEEL MATERIAL AND PHOTOVOLTAIC POWER GENERATION STAND

(71) Applicant: NIPPON STEEL CORPORATION, Tokyo (JP)

(72) Inventors: Takuya Mitsunobu, Tokyo (JP); Mamoru Saito, Tokyo (JP); Hiroshi Takebayashi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/847,161

(22) PCT Filed: Jun. 13, 2024

(86) PCT No.: PCT/JP2024/021477
§ 371 (c)(1),
(2) Date: Sep. 13, 2024

(65) Prior Publication Data
US 2025/0382691 A1    Dec. 18, 2025

(51) Int. Cl.
*C23C 2/06* (2006.01)
*B32B 15/01* (2006.01)
(Continued)

(52) U.S. Cl.
CPC .............. *C23C 2/06* (2013.01); *B32B 15/012* (2013.01); *B32B 15/013* (2013.01); *B32B 15/04* (2013.01);
(Continued)

(58) Field of Classification Search
CPC ....... C23C 2/06; C23C 2/0222; C23C 2/0224; C23C 2/026; C23C 2/12; C23C 2/20;
(Continued)

(56) References Cited

U.S. PATENT DOCUMENTS 5,525,431 A * 6/1996 Kanamaru ............... C23C 22/53
148/262
2009/0053555 A1    2/2009 Nose et al.
(Continued)

FOREIGN PATENT DOCUMENTS

JP    2007-108496 A    4/2007
JP    2009-033066 A    2/2009
(Continued)

OTHER PUBLICATIONS

Machine Translation, Fujii, et al., JP 2024-002491 A, Jan. 11, 2024. (Year: 2024).*
(Continued)

*Primary Examiner* — Michael E. La Villa
(74) *Attorney, Agent, or Firm* — Birch, Stewart, Kolasch & Birch, LLP

(57) ABSTRACT

This plated steel material includes a steel sheet, a plated layer formed on the steel sheet, and an oxide layer formed on the plated layer, in which the plated layer has a chemical composition containing, by mass %, 1.0 to 60.0% of Al, 1.0 to 15.0% of Mg, 0 to 2.0% of Si, 0 to 2.0% of Ca, and 0 to 2.0% of Fe, and a remainder being of Zn and impurities, the oxide layer has a thickness of 5 nm or more, and a (Al+Mg)/Zn intensity ratio that is the ratio of the total of the maximum intensity of Al and the maximum intensity of Mg to the maximum intensity of Zn in energy dispersive X-ray analysis of the oxide layer is 1.0 or more, and the oxide layer includes an amorphous microstructure.

11 Claims, 2 Drawing Sheets

(51) Int. Cl.

| | |
|---|---|
| B32B 15/04 | (2006.01) |
| B32B 15/18 | (2006.01) |
| B32B 15/20 | (2006.01) |
| C22C 18/00 | (2006.01) |
| C22C 18/04 | (2006.01) |
| C22C 21/06 | (2006.01) |
| C22C 21/10 | (2006.01) |
| C23C 2/02 | (2006.01) |
| C23C 2/12 | (2006.01) |
| C23C 2/20 | (2006.01) |
| C23C 2/26 | (2006.01) |
| C23C 2/40 | (2006.01) |
| C23C 28/00 | (2006.01) |
| C23C 30/00 | (2006.01) |

(52) U.S. Cl.
CPC ............ *B32B 15/043* (2013.01); *B32B 15/18* (2013.01); *B32B 15/20* (2013.01); *C22C 18/00* (2013.01); *C22C 18/04* (2013.01); *C22C 21/06* (2013.01); *C22C 21/10* (2013.01); *C23C 2/0222* (2022.08); *C23C 2/0224* (2022.08); *C23C 2/026* (2022.08); *C23C 2/12* (2013.01); *C23C 2/20* (2013.01); *C23C 2/26* (2013.01); *C23C 2/261* (2022.08); *C23C 2/40* (2013.01); *C23C 28/30* (2013.01); *C23C 28/32* (2013.01); *C23C 28/321* (2013.01); *C23C 28/322* (2013.01); *C23C 28/3225* (2013.01); *C23C 28/34* (2013.01); *C23C 28/345* (2013.01); *C23C 30/00* (2013.01); *C23C 30/005* (2013.01); *Y10T 428/12583* (2015.01); *Y10T 428/1259* (2015.01); *Y10T 428/12597* (2015.01); *Y10T 428/12604* (2015.01); *Y10T 428/12611* (2015.01); *Y10T 428/12618* (2015.01); *Y10T 428/12757* (2015.01); *Y10T 428/12799* (2015.01)

(58) Field of Classification Search
CPC .. C23C 2/40; C23C 2/26; C23C 2/261; C23C 28/30; C23C 28/32; C23C 28/321; C23C 28/322; C23C 28/3225; C23C 28/34; C23C 28/345; C23C 30/00; C23C 30/005; C22C 18/00; C22C 18/04; C22C 21/10; C22C 21/06; B32B 15/012; B32B 15/013; B32B 15/04; B32B 15/043; B32B 15/18; B32B 15/20; Y10T 428/12611; Y10T 428/12583; Y10T 428/1259; Y10T 428/12597; Y10T 428/12604; Y10T 428/12618; Y10T 428/12757; Y10T 428/12799

See application file for complete search history.

(56) References Cited

U.S. PATENT DOCUMENTS

| | | |
|---|---|---|
| 2020/0080205 A1 | 3/2020 | Ko et al. |
| 2023/0383392 A1 | 11/2023 | Mitsunobu et al. |
| 2025/0003048 A1 | 1/2025 | Mitsunobu et al. |

FOREIGN PATENT DOCUMENTS

| | | | |
|---|---|---|---|
| JP | 2020-502368 A | | 1/2020 |
| JP | 2024002491 A | * | 1/2024 |
| WO | WO 2007/108496 A1 | | 9/2007 |
| WO | WO 2013/187030 A1 | | 12/2013 |
| WO | WO 2022/153840 A1 | | 7/2022 |
| WO | WO 2023/145822 A1 | | 8/2023 |

OTHER PUBLICATIONS

Written Opinion of the International Searching Authority (Form PCT/ISA/237) for International Application No. PCT/JP2024/021477, dated Aug. 27, 2024, with English translation.

* cited by examiner

PLATED STEEL MATERIAL AND PHOTOVOLTAIC POWER GENERATION STAND

TECHNICAL FIELD

The present disclosure relates to a plated steel material and a photovoltaic power generation stand.

BACKGROUND ART

A steel material on the surface of which a hot-dip Zn-plated layer containing Al and Mg is formed (a hot-dip Zn—Al—Mg-based plated steel material) has excellent corrosion resistance. Therefore, hot-dip Zn—Al—Mg-based plated steel materials are widely used, for example, as a material for structural members required to have corrosion resistance, such as building materials.

For example, Patent Document 1 discloses a plated steel sheet material including a steel sheet, a plated layer formed on at least a part of a surface of the steel sheet, and an oxide layer formed on at least a part of a surface of the plated layer, in which $IMg/IMg_{Ox}$, which is a ratio of a maximum detection intensity of Mg to a maximum detection intensity of an oxide or hydroxide of Mg, is 0.00 or more and 1.20 or less when measurement is performed by XPS at a position of 5.0 nm in a thickness direction from the surface of the oxide layer. Patent Document 1 discloses that with the above composition, the proportion of Mg contained in the plated layer as an oxide [MgO] or a hydroxide [Mg(OH)$_2$] can be increased, and the proportion of Al contained in the plated layer as an oxide [Al$_2$O$_3$] or a hydroxide [Al(OH)$_3$] can be decreased, so that the lubricity and chemical convertibility of the plated layer can be improved.

CITATION LIST

Patent Document

Patent Document 1: PCT International Publication No. WO 2022/153840

SUMMARY OF INVENTION

Technical Problem

In recent years, hot-dip Zn—Al—Mg-based plated steel materials are also required to have water flow corrosion resistance. The water flow corrosion resistance is corrosion resistance in a state of being exposed to water flow. In a water flow environment, corrosion products adhering to the surface of the hot-dip plated layer flow, and the antirust effect exhibited by the corrosion products is impaired. Therefore, the water flow corrosion resistance of the steel material is evaluated by means different from normal corrosion resistance. For example, a material used as various building materials used outdoors, such as a protective fence installed on a road, a stand for photovoltaic power generation, or a wall surface of a water channel through which rainwater and industrial water always flow, is required to have high water flow corrosion resistance.

In the prior art, water flow corrosion resistance is hardly considered. For example, flat portion corrosion resistance, which is well known as a conventional evaluation method, is often evaluated in accordance with JASO M609-91, and in this evaluation, a corrosive solution is considered to have no flow.

Furthermore, as a result of examination by the present inventors, it has been found that even a hot-dip Zn—Al—Mg-based plated steel material having high normal corrosion resistance is not sufficient in water flow corrosion resistance. For example, in Patent Document 1, the proportion of each oxide in the oxide layer on the surface of the plated layer is defined, but the present inventors have found that there is a case where corrosion is likely to occur under a water flow environment, that is, the water flow corrosion resistance is insufficient only by the defined proportion.

The present disclosure has been made in view of the above circumstances. An object of the present disclosure is to provide a plated steel material and a photovoltaic power generation stand having excellent water flow corrosion resistance.

Solution to Problem

The gist of the present disclosure is as follows.

[1] A plated steel material according to one aspect of the present invention includes:
  a steel sheet; a plated layer formed on the steel sheet; and an oxide layer formed on the plated layer,
  wherein the plated layer has a chemical composition comprising, by mass %,
  1.0 to 60.0% of Al,
  1.0 to 15.0% of Mg,
  0 to 2.0% of Si,
  0 to 2.0% of Ca, and
  0 to 2.0% of Fe,
  and further contains 5.0% or less in total of one or more selected from the group consisting of
  0 to 1.000% of Ni,
  0 to 0.500% of La,
  0 to 0.500% of Ce,
  0 to 0.500% of Sb,
  0 to 0.500% of Pb,
  0 to 0.500% of Sr,
  0 to 0.500% of Bi,
  0 to 1.000% of Sn,
  0 to 1.000% of Cu,
  0 to 1.000% of Ti,
  0 to 1.000% of Mn,
  0 to 1.000% of Cr,
  0 to 1.000% of Nb,
  0 to 1.000% of Zr,
  0 to 1.000% of Mo,
  0 to 1.000% of V,
  0 to 1.000% of In,
  0 to 1.000% of Co,
  0 to 1.000% of Ag,
  0 to 1.000% of Li,
  0 to 0.500% of B,
  0 to 0.500% of Y, and
  0 to 0.500% of P, and a remainder being of Zn and impurities,
  the oxide layer has a thickness of 5 nm or more, and
  a (Al+Mg)/Zn intensity ratio that is a ratio of the total of the maximum intensity of Al and the maximum intensity of Mg to the maximum intensity of Zn in energy dispersive X-ray analysis of the oxide layer is 1.0 or more, and
  the oxide layer includes an amorphous microstructure.

[2] In the plated steel material according to [1], the chemical composition of the plated layer may contain, by mass %, one or two or more selected from the group consisting of
  0.1 to 2.0% of Si,
  0.1 to 2.0% of Ca, 0.1 to 2.0% of Fe,
0.001 to 1.000% of Ni,
0.010 to 0.500% of La,
0.010 to 0.500% of Ce,
0.001 to 0.500% of Sb,
0.001 to 0.500% of Pb,
0.001 to 0.500% of Sr,
0.001 to 0.500% of Bi,
0.050 to 1.000% of Sn,
0.001 to 1.000% of Cu,
0.001 to 1.000% of Ti,
0.001 to 1.000% of Mn,
0.001 to 1.000% of Cr,
0.001 to 1.000% of Nb,
0.001 to 1.000% of Zr,
0.001 to 1.000% of Mo,
0.001 to 1.000% of V,
0.001 to 1.000% of In,
0.001 to 1.000% of Co,
0.001 to 1.000% of Ag,
0.001 to 1.000% of Li,
0.001 to 0.500% of B,
0.010 to 0.500% of Y, and
0.001 to 0.500% of P.

[3] The plated steel material according to [1] or [2] contains, in the chemical composition of the plated layer, 10.0 to 30.0 mass % of Al, and
4.0 to 15.0 mass % of Mg,
and
the (Al+Mg)/Zn intensity ratio of the oxide layer may be 2.0 or more.

[4] The plated steel material according to any one of the above [1] to [3] contains, in the chemical composition of the plated layer, 15.0 to 30.0 mass % of Al, and
4.0 to 15.0 mass % of Mg
and
the (Al+Mg)/Zn intensity ratio of the oxide layer may be 3.0 or more.

[5] In the plated steel material according to any one of [1] to [4], a diffraction spot indicating a crystalline microstructure may not be detected in an electron beam diffraction image obtained by analyzing a cross section of the oxide layer using electron beam diffraction.

[6] A photovoltaic power generation stand according to an aspect of the present invention includes the plated steel material according to any one of [1] to [5].

Advantageous Effects of Invention

According to the above aspect of the present disclosure, it is possible to provide a plated steel material and a photovoltaic power generation stand having excellent water flow corrosion resistance.

DESCRIPTION OF EMBODIMENTS

Figure 1:
FIG. 1 is an electron beam diffraction image of a cross section of an oxide layer by a transmission electron microscope (TEM) in a plated steel material according to the present embodiment.

A plated steel material according to an embodiment of the present disclosure (Hereinafter, it may be referred to as a plated steel material according to the present embodiment.) will be described. However, the present disclosure is not limited only to the composition disclosed in the present embodiment, and various modifications can be made without departing from the gist of the present disclosure.

Hereinafter, each composition requirement of the present disclosure will be described in detail.

In the ranges of numerical value limitations described below with "to" interposed therebetween, the lower limit value and the upper limit value are included in the range. A numerical value indicated as "less than" or "more than" is not included in the numerical range. In the following description, % relating to the chemical composition is mass % unless otherwise specified.

[Hot-Dip Plated Steel Material]

The plated steel material according to the present embodiment includes a steel sheet, a plated layer formed on the steel sheet, and an oxide layer formed on the plated layer. In the plated steel material according to the present embodiment, the thickness of the oxide layer is 5 nm or more, the (Al+Mg)/Zn intensity ratio, which is the ratio of the total of the maximum intensity of Al and the maximum intensity of Mg to the maximum intensity of Zn in the energy dispersive X-ray analysis of the oxide layer, is 1.0 or more, and the oxide layer includes an amorphous microstructure.

<Steel Material>

A steel material to be plated will be described.

The steel material is, for example, mainly a steel sheet, but its size is not particularly limited.

The steel sheet may be a steel sheet applicable to an ordinary hot-dip galvanizing step. In particular, steel sheets applicable in the step of solidification by immersion in molten metal, such as a continuous hot-dip galvanizing line (CGL), apply to this. As the size of the steel sheet, for example, a steel sheet having a sheet thickness of 10 mm or less and a sheet width of 2000 mm or less can be applied, but the size of the steel sheet is not limited thereto.

A material of the steel material is not particularly limited. As the steel material, for example, various steel sheets such as a general steel, an Al-killed steel, an ultra-low carbon steel, a high carbon steel, various high tensile strength steels, some high alloy steels (a steel containing a corrosion resistance reinforcing element such as Ni or Cr), a bolt steel, and a steel wire rod for bridge cable can be applied. More specifically, for example, a cold-rolled steel sheet defined in JIS G 3131, 3141:2017, a steel sheet included in a general structural rolled steel material corresponding to a so-called SS material, a so-called general steel included in a hot-rolled steel sheet defined in JIS G3193: 2008, a pre-plated steel such as JIS H8641, JIS G 3302, 3303, 3313, 3314, 3315, 3317, and 3321 in which various metals are thinly plated, a JIS G 3136Al killed steel, an ultra-low carbon steel, a high carbon steel, and various high tensile strength steels described in JIS G 3113, 3134, and 3135 can be applied.

<Oxide Layer>

The plated steel material according to the present embodiment includes an oxide layer on the plated layer. When the plated layer is provided on both surfaces of the steel material, the oxide layer may be provided on one surface or both surfaces of the plated layer.

The present inventors have studied a method for improving water flow corrosion resistance in a plated steel material (particularly, a Zn—Al—Mg-based plated steel material). As a result, the present inventors have found that water flow corrosion resistance is enhanced when the oxide layer includes an amorphous microstructure. Specifically, the present inventors have found that when the (Al+Mg)/Zn intensity ratio, which is the ratio of the total of the maximum intensity of Al and the maximum intensity of Mg to the maximum intensity of Zn in the energy dispersive X-ray analysis of the oxide layer, is 1.0 or more, water flow corrosion resistance is improved.

The reason why the water flow corrosion resistance of the plated layer is improved by including the amorphous microstructure in the oxide layer is not clear, but the present inventors consider the reason as follows.

First, as the amorphization of the microstructure in the oxide layer progresses, grain boundaries decrease. Since grain boundaries generally have a property of being easily corroded, it is considered that the presence of grain boundaries is reduced by amorphization of the microstructure, thereby improving water flow corrosion resistance.

In addition, it is preferable that the oxide layer does not contain a crystalline microstructure. That is, all the oxides constituting the oxide layer are preferably amorphous. However, the water flow corrosion resistance is greatly affected particularly by the surface layer area of the oxide layer. Therefore, the surface layer area of the oxide layer may be amorphous. The "surface layer area" mentioned herein is a region from the outermost surface of the oxide layer to a depth of 100 nm.

Whether the microstructure contained in the oxide layer is amorphous or crystalline can be confirmed by an electron beam diffraction image of a cross section of the oxide layer by TEM (transmission electron microscope). In the case of an amorphous microstructure, a halo pattern is confirmed, and in the case where a crystalline microstructure (metal) is included, a diffraction spot (crystal diffraction spot) showing a crystalline microstructure is confirmed around the halo pattern.

Figure 2:
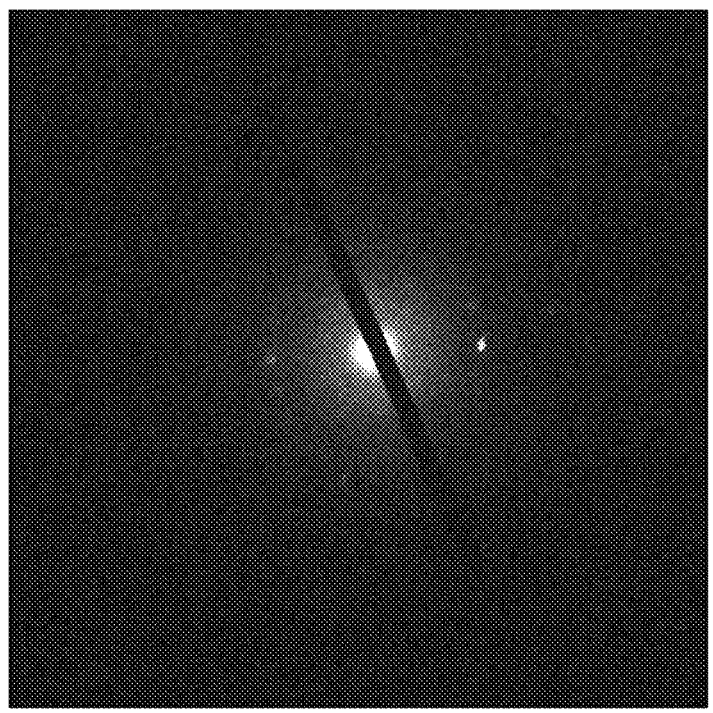
FIG. 2 is an electron beam diffraction image of a cross section of an oxide layer by a transmission electron microscope (TEM) in a plated steel material according to the present embodiment.

FIGS. 1 and 2 are electron beam diffraction images of a cross section of an oxide layer by a transmission electron microscope (TEM) in the plated steel material according to the present embodiment. In the case of the electron beam diffraction image shown in FIG. 1, since only the halo pattern is confirmed, it is found that the microstructure contained in the oxide layer is an amorphous microstructure. In addition, in the case of the electron beam diffraction image shown in FIG. 2, since a crystal diffraction spot is confirmed around the halo pattern, it is found that both the amorphous microstructure and the metal are contained in the oxide layer. In the present embodiment, the pattern may be any of the patterns of FIGS. 1 and 2. That is, the halo pattern may be confirmed in the electron beam diffraction image.

Hereinafter, a method for determining the microstructure included in the oxide layer will be described.

In the present embodiment, first, a 10 μm square sample for analysis is collected from a plated steel material so as to include a cross section of an oxide layer along a sheet thickness direction, and the sample is sliced to a thickness of 50 to 100 nm.

Next, the surface of the sample corresponding to the cross section of the oxide layer is measured at five points every 2 μm in the direction along the sheet surface with a TEM ("JEM-2100F", manufactured by JEOL Ltd.) with a probe diameter of an electron beam of 3 nm to obtain five electron beam diffraction images. If there is at least one halo pattern image in the obtained electron beam diffraction image, it is assumed that the oxide layer includes an amorphous microstructure. The acceleration voltage during TEM observation is 200 kV. When a sample for analysis is collected including a plated layer, the plated layer is excluded from the measurement target, and only the oxide layer is measured.

In addition, the (Al+Mg)/Zn intensity ratio, which is the ratio of the total of the maximum intensity of Al and the maximum intensity of Mg to the maximum intensity of Zn in the energy dispersive X-ray analysis of the oxide layer, is 1.0 or more.

Al and Mg are elements that easily form a passivation coating as compared with Zn. That is, the higher the amounts of Al and Mg contained in the oxide layer, the greater the effect of improving corrosion resistance. In addition, the Al oxide tends to be amorphous (amorphous). On the other hand, since Zn oxide tends to be crystalline, an amorphous oxide layer can be easily obtained by increasing the amount of Al and Mg in the oxide layer more than Zn. From such a viewpoint, the (Al+Mg)/Zn intensity ratio is 1.0 or more. It is preferably 2.0 or more, and more preferably 3.0 or more. The upper limit of the (Al+Mg)/Zn intensity ratio is not particularly limited, but may be 6.0 or less.

The (Al+Mg)/Zn intensity ratio can be determined by the following method.

First, a 10 μm square sample for analysis is collected from a plated steel material so as to include a cross section of an oxide layer along a sheet thickness direction, and the sample is sliced to a thickness of 50 to 100 nm. Then, a cross section of the oxide layer is observed with a transmission-type electron microscope (TEM-EDS) equipped with an energy dispersive X-ray analyzer (EDS; "JED-2300Tx2", manufactured by JEOL Ltd.) at a probe diameter of an electron beam of 3 nm and an irradiation current (setting value) of 1.0 nA, and EDS analysis is performed at five points every 2 μm in a direction along the sheet surface. The observation position by TEM is a ½ thickness position in the cross section of the oxide layer, the acceleration voltage at the time of observation is 200 kV, and the electron beam irradiation time is until the maximum peak intensity in the spectrum obtained by the EDS measurement becomes 2000 counts or more.

Next, the maximum intensity (cps) of Zn, the maximum intensity (cps) of Al, and the maximum intensity (cps) of Mg are determined from the obtained X-ray analysis results, and the ratio of the total of the maximum intensity of Al and the maximum intensity of Mg to the maximum intensity of Zn is calculated. The intensity ratio is obtained at each of the obtained five points, and the average thereof is defined as "(Al+Mg)/Zn intensity ratio" in the present embodiment. In the obtained X-ray analysis results, "Zn" shows a peak in the range of 1.01±0.1 eV, "Al" shows a peak in the range of 1.49±0.1 eV, and "Mg" shows a peak in the range of 1.25±0.1 eV. By analyzing the peaks in these ranges, the maximum intensity (cps) of Zn, the maximum intensity (cps) of Al, and the maximum intensity (cps) of Mg can be determined.

The oxide layer has a thickness of 5 nm or more. When the thickness of the oxide layer is too small, sufficient water flow corrosion resistance may not be obtained. Therefore, the thickness of the oxide layer is 5 nm or more. The thickness is preferably 10 nm or more, more preferably 15 nm or more, and still more preferably 20 nm or more. The upper limit of the thickness of the oxide layer is not particularly limited, but is, for example, 50 nm or less.

The thickness of the oxide layer is measured by the following method.

Using an image of a transmission-type electron microscope (TEM-EDS) obtained in the same manner as in the measurement of the (Al+Mg)/Zn intensity ratio, the thickness of the oxide layer is measured at five points at a pitch of 1 nm on the cross section of the oxide layer, and the average value thereof is defined as the "thickness of the oxide layer".

<Plated Layer>

The plated steel material according to the present embodiment includes a plated layer on the steel material. The plated layer may be formed on one surface or both surfaces of the steel material.

The adhesion content of the plated layer is preferably 15 to 250 g/m² per one surface.

(Microstructure of Plated Layer)

In the plated steel sheet according to the present embodiment, the plated microstructure is not particularly limited. According to the chemical composition of the plated layer of the plated steel sheet according to the present embodiment, the plating microstructure includes, for example, a (Al—Zn) dendrite, a lamellar microstructure of a (Al—Zn)/MgZn$_2$, a lamellar microstructure of a Zn/MgZn$_2$, a ternary eutectic structure of Zn/Al/MgZn$_2$, an MgZn$_2$, a dendrite or amorphous Zn, an Mg$_2$Si, and/or another intermetallic compound.

(Chemical Composition of Plated Layer)

The chemical composition of the plated layer of the plated steel material according to the present embodiment will be described. Hereinafter, % relating to the chemical composition is all mass %.

Al: 1.0 to 60.0%

Al is an element effective for securing corrosion resistance in a plated layer containing aluminum (Al), zinc (Zn), and magnesium (Mg). In order to sufficiently obtain the above effect, the Al content is set to 1.0% or more. The Al content is preferably 5.0% or more, more preferably 10.0% or more.

On the other hand, when the Al content is more than 60.0%, corrosion resistance and corrosion resistance of the cut end surface of the plated layer are deteriorated. In addition, the generation of Al oxide increases, and the crystallinity of the oxide layer may increase. Therefore, the Al content is 60.0% or less. The Al content is preferably 50.0% or less, more preferably 40.0% or less.

Mg: 1.0 to 15.0%

Mg is an element having an effect of enhancing the corrosion resistance of the plated layer. In order to sufficiently obtain the above effect, the Mg content is set to 1.0% or more. The Mg content is preferably 4.0% or more, more preferably 5.0% or more.

On the other hand, when the Mg content is more than 15.0%, corrosion resistance is deteriorated. In addition, there is a manufacturing-related problem such as an increase in amount of dross generated in a plating bath. Therefore, the Mg content is 15.0% or less. The Mg content is preferably 11.0% or less.

Si: 0 to 2.0%

Si is an element that forms a compound together with Mg and contributes to improvement of corrosion resistance of the plated layer. In addition, Si is also an element having an effect of suppressing formation of an excessively thick alloy layer formed between the steel sheet and the plated layer to enhance adhesion between the steel sheet and the plated layer when the plated layer is formed on the steel sheet. Therefore, it may be contained. Si is not necessarily contained, and the lower limit thereof is 0%, but in the case of obtaining the above effect, the Si content is preferably 0.1% or more.

On the other hand, when the Si content is more than 2.0%, corrosion resistance after coating is deteriorated due to excessive Si crystallized in the plated layer, insufficient formation of a lamellar microstructure, or the like. In addition, the workability of the plated layer is deteriorated. Therefore, the Si content is set to 2.0% or less. The Si content is more preferably 1.5% or less.

Ca: 0 to 2.0%

When Ca is contained in the plated layer, the formation amount of dross that is likely to be formed during plating operation decreases with an increase in the Mg content, and plating manufacturability is improved. Therefore, Ca may be contained. Ca is not necessarily contained, and the lower limit is 0%, but when the above effect is obtained, the Ca content is preferably 0.1% or more.

On the other hand, when the Ca content is excessive, corrosion resistance tends to decrease. Therefore, the Ca content is 2.0% or less. The Ca content is preferably 1.0% or less.

Fe: 0 to 2.0%

When the plated layer is manufactured, Fe may be mixed into the plated layer as an impurity from a steel sheet or the like which is a plating substrate. It may contain up to about 2.0%, but in this range, the adverse effect on the characteristics of the plated steel sheet according to the present embodiment is small. Therefore, the Fe content is preferably 2.0% or less. The Fe content is more preferably 1.5% or less, still more preferably 1.0% or less.

On the other hand, since it takes a significant cost to completely prevent mixing of Fe, the Fe content may be 0.1% or more.

The chemical composition of the plated layer of the plated steel material according to the present embodiment has the above chemical composition, and the remainder is Zn and impurities. The plated layer of the plated steel material according to the present embodiment may further contain, in place of a part of Zn, for example, one or more selected from the group consisting of Ni, La, Ce, Sb, Pb, Sr, Bi, Sn, Cu, Ti, Mn, Cr, Nb, Zr, Mo, V, In, Co, Ag, Li, B, Y, and P in the following range, and 5.000% or less in total. Since these elements are not necessarily contained, the lower limit of each amount is 0%. The amount of these elements is more preferably 3.000% or less in total.

La: 0 to 0.500%

Ce: 0 to 0.500%

Y: 0 to 0.500%

La, Ce, and Y are elements that contribute to improvement of corrosion resistance of the plated layer. Therefore, one or more of La, Ce, and Y may be contained. It is not necessary to contain any of La, Ce, and Y, and the lower limit is 0%, but in the case of obtaining the above effect, the amount of each of La, Ce, and Y is preferably 0.010% or more.

On the other hand, when the amount of La, Ce, and Y exceeds 0.500%, the viscosity of the plating bath increases, and it is often difficult to perform the initial make-up of plating bath itself, and a plated steel sheet having good plating properties cannot be manufactured. Therefore, the amount of each of La, Ce, and Y is set to 0.500% or less.

Sb: 0 to 0.500%

Pb: 0 to 0.500%

Sr: 0 to 0.500%

Bi: 0 to 0.500%

Sb, Pb, Sr, and Bi contribute to improvement of corrosion resistance. When this effect is sufficiently obtained, the amount of any one of Sb, Pb, Sr, and Bi is preferably 0.001% or more. The amounts of Sb, Pb, Sr, and Bi are each more preferably 0.005% or more, still more preferably 0.050% or more.

On the other hand, when the amount of any one of Sb, Pb, Sr, and Bi is more than 0.500%, corrosion resistance may be deteriorated. Therefore, the amounts of Sb, Pb, Sr, and Bi are each 0.500% or less. The amounts of Sb, Pb, Sr, and Bi are each preferably 0.300% or less, and more preferably 0.200% or less.

Sn: 0 to 1.000%

Sn is an element that increases the Mg elution rate in the plated layer containing Zn, Al, and Mg. When the elution rate of Mg increases, flat portion corrosion resistance may deteriorate. Therefore, the upper limit value of the Sn content is 1.000% or less. The Sn content is preferably 0.500% or less. On the other hand, Sn is an element contributing to improvement of sacrificial corrosion resistance. When this effect is sufficiently obtained, the Sn content is preferably 0.050% or more. The Sn content is more preferably 0.100% or more.

Cu: 0 to 1.000%
Ti: 0 to 1.000%
Cr: 0 to 1.000%
Nb: 0 to 1.000%
Ni: 0 to 1.000%
Mn: 0 to 1.000%
Mo: 0 to 1.000%
V: 0 to 1.000%
In: 0 to 1.000%
Co: 0 to 1.000%

Cu, Ti, Cr, Nb, Ni, Mn, Mo, V, In, and Co contribute to improvement of corrosion resistance. When this effect is sufficiently obtained, the amount of any one of the above elements is preferably 0.001% or more. The amount of each of the elements is more preferably 0.005% or more, still more preferably 0.050% or more.

On the other hand, when the amount of any one of the above elements is more than 1.000%, red rust resistance may be deteriorated. Therefore, the amount of each of the elements is 1.000% or less. The amount of each of the elements is preferably 0.300% or less, and more preferably 0.200% or less.

Zr: 0 to 1.000%
Ag: 0 to 1.000%
Li: 0 to 1.000%

Zr, Ag, and Li are elements for improving corrosion resistance of the plated layer. When this effect is sufficiently obtained, the amount of any one of Zr, Ag, and Li is preferably 0.001% or more. The amounts of Zr, Ag and Li are each more preferably 0.005% or more, still more preferably 0.020% or more.

On the other hand, when the amounts of Zr, Ag, and Li are excessively large, corrosion resistance may be deteriorated. When the amount of any one of Zr, Ag, and Li is more than 1.000%, red rust resistance is remarkably deteriorated. Therefore, the amounts of Zr, Ag, and Li are each 1.000% or less. The amounts of Zr, Ag, and Li are each preferably 0.500% or less, and more preferably 0.100% or less.

B: 0 to 0.500%,
P: 0 to 0.500%

B and P are elements for improving external appearance. When this effect is sufficiently obtained, the amount of any one of B and P is preferably 0.001% or more. Each of the amounts of B and P is more preferably 0.005% or more, still more preferably 0.020% or more.

On the other hand, when the amounts of B and P are excessively large, corrosion resistance may be deteriorated. When the amount of any one of B and P is more than 0.500%, corrosion resistance is remarkably deteriorated. Therefore, the amounts of B and P are each 1.000% or less. The amounts of B and P are each preferably 0.500% or less, and more preferably 0.100% or less.

In the present embodiment, the impurity may include the impurity mixed from a manufacturing environment or the like and/or an element in a range that does not adversely affect the characteristics of the plated steel material according to the present embodiment.

The chemical composition of the plated layer is measured with the following method.

First, a rectangular sample of 50 mm×50 mm including the total thickness of the plated layer is collected from the plated layer, and an acid solution in which the plated layer of the sample is dissolved with 10 vol % HCl containing 0.04 vol % of IBIT 710 (manufactured by ASAHI Chemical Co., Ltd.), which is an inhibitor for suppressing corrosion of base metal (steel sheet), is obtained. The sample is collected from a site where the microstructure of the plated layer or the like is not affected by processing, heat treatment, or the like (for example, a part avoiding a processed part, a welded part, or the like). Next, the obtained acid solution is measured by ICP analysis, and thus the chemical composition of the plated layer can be obtained. The type of the acid is not particularly limited as long as the acid can dissolve the plated layer. The chemical composition of the plated layer of the present embodiment is an average of measurements performed on three samples.

[Method for Manufacturing Plated Steel Material]

Next, a preferred method for manufacturing the plated steel material according to the present embodiment will be described. The effect of the plated steel sheet according to the present embodiment can be obtained as long as it has the above characteristics regardless of the manufacturing method. However, the following method is preferable because the plated steel material according to the present embodiment can be stably manufactured.

Specifically, the plated steel material according to the present embodiment can be manufactured by a manufacturing method including the following steps (1) to (III).

(I) Annealing step of reducing annealing steel sheet
(II) Plating step of immersing steel sheet in plating bath containing Al, Mg, and Zn to obtain plated original sheet
(III) Controlled cooling step of cooling the plated original sheet at an average cooling rate of 7° C./sec or less in an $N_2$ gas atmosphere having a dew point of 0° C. or higher in a temperature range of a bath temperature to a controlled cooling temperature.

Hereinafter, preferred conditions for each step will be described.

First, a steel material (base steel) for forming a plated layer is prepared. Suitable steel materials are as described above, and examples thereof include general steel, high tensile strength steel, and low carbon steel.

When a pre-plated steel material is used as the steel material, a pre-plated layer is formed on the surface of the steel material before the annealing step. Examples of the pre-plated layer include a Ni pre-plated layer. By providing the pre-plated layer on the surface of the steel material, amorphization of the plated layer formed in the subsequent step can be promoted. The plating means may be hot-dip plating, electro plating, substitution plating, or vapor deposition (PVD or the like). Furthermore, the pre-plated layer may be heated and alloyed. When the pre-plated layer is provided on the surface of the steel material, the steel material provided with the pre-plated layer is used as an original sheet to be subjected to hot-dip plating.

In the production method of the pre-plated layer, electro plating is suitable because the plated layer can be formed thin. Deposition (PVD) is also applicable.

The adhesion content of the pre-plated layer by electro plating can be adjusted by controlling the cumulative energization time. When a Ni pre-plated layer is formed as a pre-plated layer, the adhesion content is preferably, for example, 0.1 to 2.5 g/m$^2$.

<Annealing Step>

Prior to the plating step, the steel material obtained by a known method may be subjected to reducing annealing. Examples of the steel material include a hot-rolled steel sheet and a cold-rolled steel sheet. The annealing conditions may be known conditions, for example, heating to 750 to 900° C. under a 5% H$_2$—N$_2$ gas atmosphere having a dew point of −10° C. or higher and retaining it for 30 to 240 seconds.

<Plating Step>

After the annealing, the steel material, which is the plated original sheet, is immersed in the plating bath. The composition of the plating bath is adjusted so that the plated layer has the chemical composition of the plated layer described above. The bath temperature of the plating bath is preferably 420 to 700° C. If the bath temperature is too low, the plated layer may start to solidify during the plating step. Therefore, it is preferable that the bath temperature is high, but if the bath temperature is excessively high, the manufacturing cost increases. Therefore, the bath temperature of the plating bath is preferably in the range of 420 to 700° C.

<Controlled Cooling Step>

In the controlled cooling step, the plated original sheet after the plating step is cooled under a predetermined condition after the plating adhesion content is adjusted with a wiping gas such as N$_2$ gas.

Specifically, the plated original sheet pulled up from the plating bath is cooled to a controlled cooling temperature or lower. At this time, the plated original sheet has a temperature equivalent to the plating bath temperature. The controlled cooling temperature is a temperature at which the slow cooling and high dew point atmosphere is changed to the rapid cooling and low dew point atmosphere, and is 300° C. to 330° C. In the controlled cooling step, the average cooling rate from the bath temperature to the controlled cooling temperature is set to 7° C./sec or less, and the dew point of the atmosphere in cooling from the bath temperature to the controlled cooling temperature is set to 0° C. or more. Examples of the atmosphere gas during cooling include N$_2$ gas and Ar gas.

When the average cooling rate from the bath temperature to the controlled cooling temperature is reduced, the plated layer on the steel material is slowly cooled while remaining in a molten state, so that the surface layer area of the plated layer tends to be amorphous. When the surface layer area of the plated layer becomes amorphous, the oxide layer formed thereon can also include an amorphous microstructure. The surface layer area of the plated layer refers to a peripheral region of an interface between the oxide layer and the plated layer. In addition, by slowly cooling from the bath temperature to the controlled cooling temperature, the thickness of the oxide layer formed on the plated layer can be increased, and as a result, the water flow corrosion resistance can be improved. Furthermore, by slowly cooling from the bath temperature to the controlled cooling temperature, the amount of Al and Mg in the oxide layer can be made higher than that of Zn, and the (Al+Mg)/Zn intensity ratio can be made higher. On the other hand, when the average cooling rate from the bath temperature to the controlled cooling temperature is more than 7° C./sec, the plated layer is solidified from the surface, and a crystalline metal layer may be formed on the surface of the plated layer. In this case, a large amount of crystalline oxide may be formed in the oxide layer formed on the plated layer. Therefore, the average cooling rate from the bath temperature to the controlled cooling temperature is set to 7° C./sec or less. From the viewpoint of forming an oxide layer having a sufficient thickness, the average cooling rate from the bath temperature to the controlled cooling temperature is preferably 4° C./s or less, and more preferably 2° C./s or less. The lower limit of the average cooling rate from the bath temperature to the controlled cooling temperature is not particularly limited, but may be 1.5° C./sec or more from the viewpoint of manufacturing cost.

When the dew point of the atmosphere from the bath temperature to the controlled cooling temperature is less than 0° C., the thickness of the oxide layer may not be sufficiently secured. When the cooling step is performed in the air atmosphere, water vapor in the air promotes nucleation of crystals, and the plated layer may be solidified from the surface to form a crystalline metal layer. Therefore, the atmosphere dew point from the bath temperature to the controlled cooling temperature is set to 0° C. or more. The upper limit of the atmosphere dew point from the bath temperature to the controlled cooling temperature is not particularly limited, but may be 40° C. or lower from the viewpoint of manufacturing cost. As the atmosphere gas, N$_2$ gas, Ar gas, or the like may be used.

In a temperature range below the controlled cooling temperature, the plated original sheet is cooled at an average cooling rate of 15° C./sec or more and a dew point of the atmosphere of −30° C. or less. In order to maintain the amorphous oxide layer formed in a temperature range from the bath temperature to the controlled cooling temperature, the plated original sheet is rapidly cooled at a low dew point in a temperature range lower than the controlled cooling temperature. Therefore, in the temperature range below the controlled cooling temperature, the average cooling rate is set to 15° C./sec or more. The upper limit of the average cooling rate in the temperature range lower than the controlled cooling temperature is not particularly limited, but may be 80° C./sec or less from the viewpoint of manufacturing cost. In addition, by setting the dew point of the atmosphere in the temperature range lower than the controlled cooling temperature to a low dew point of −30° C. or lower, the growth of the oxide can be suppressed, and the transformation from the amorphous microstructure to the crystalline microstructure can be suppressed by rapid cooling. The dew point of the atmosphere in the temperature range lower than the controlled cooling temperature is preferably −40° C. or lower. The lower limit of the atmosphere dew point in the temperature range lower than the controlled cooling temperature is not particularly limited, but may be −70° C. or higher from the viewpoint of manufacturing cost. The low dew point and quenching may be performed up to 70° C.

By the method described above, the plated steel material according to the present embodiment can be stably manufactured.

[Photovoltaic Power Generation Stand]

Figure 3:
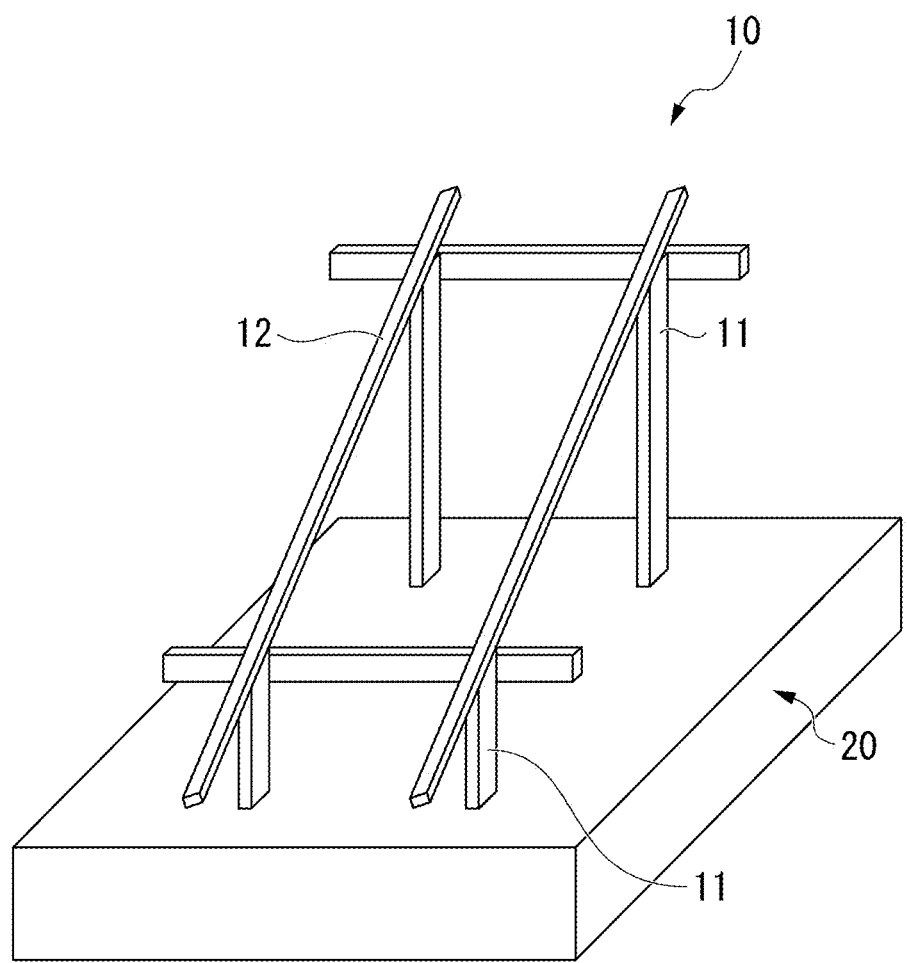
FIG. 3 is a schematic view illustrating an example of a photovoltaic power generation stand according to the present embodiment.

The plated steel material of the present embodiment is excellent in water flow corrosion resistance, and thus is used for, for example, a photovoltaic power generation stand. FIG. 3 is a perspective view illustrating an example of the photovoltaic power generation stand 10.

The photovoltaic power generation stand 10 includes, for example, a plurality of support columns 11 and a plurality of support members 12. The plated steel material of the present embodiment is suitably used for the support column 11 and the support member 12. The photovoltaic power generation stand 10 satisfies the characteristics of the plated layer and the oxide layer in the plated steel material of the present embodiment, and thus is excellent in durable years.

In addition, the plated steel material of the present embodiment may be applied to the basic structure 20 for mounting the photovoltaic power generation stand 10. The basic structure 20 is formed on the basis of, for example, concrete, and in this case, the plated steel material of the present embodiment may be embedded in the basis of concrete or the like.

Examples

The effect of one aspect of the present invention is described more specifically with reference to examples. However, the conditions in Examples are merely one condition example adopted to confirm the operability and effects of the present invention. The present invention is not limited to this one example. The present invention can adopt various conditions as long as the object of the present invention is achieved without departing from the gist of the present invention.

A cold-rolled steel sheet (0.05% C-0.1% Si-0.2% Mn) having a sheet thickness of 2.3 mm was prepared as a base steel material as a plated original sheet to be subjected to annealing and plating.

This base steel material was cut into a size of 100 mm×200 mm (× sheet thickness), and then subjected to annealing and hot-dip plating successively using a batch-type hot-dip plating tester.

Before immersion in a plating bath, the base steel material was subjected to a heating reduction treatment at 600° C. in an $N_2$-5% $H_2$ gas atmosphere in a furnace having an oxygen concentration of 20 ppm or less. Thereafter, the base steel material was air-cooled with $N_2$ gas, and after the sheet temperature during immersion reached a bath temperature +20° C., the base steel material was immersed in a plating bath having a bath temperature shown in Table 1 for about 3 seconds.

Then, the base steel material was pulled up to attach the plated layer to the surface of the base steel material. At the time of pulling up, the plating adhesion content was controlled with $N_2$ wiping gas.

Subsequently, the plated layer was cooled under various conditions to manufacture various plated steel materials. The chemical composition of the plated layer was as shown in Table 2. The manufacturing conditions were as shown in Table 1. The plate temperature during the manufacture was measured using a thermocouple spot-welded to the central part of the plated original sheet.

The EDS analysis results and the evaluation results of the crystallinity of the oxide layer are shown in Table 3. Further, the water flow corrosion resistance of the plated steel material was evaluated, and the results are shown in Table 3.

The chemical composition of the plated layer and the analysis and evaluation of the oxide layer were performed by the above-described means. A Ni pre-plated layer was formed on some base steel materials before the plating step. The Ni adhesion content of the Ni pre-plated layer was as shown in Table 1. The components of the Ni pre-plating are included in the chemical compositions of the plated layer disclosed in Table 2.

The water flow corrosion resistance was evaluated by the following means.

The resulting plated steel material was cut to prepare a test piece having a size of 200 mm×100 mm (× steel material thickness). The prepared test piece was placed on a table having an inclination angle of 45° with respect to the horizontal plane.

Subsequently, droplets (Cl concentration: 10 ppm, $SO_4^{2-}$ concentration: 20 ppm) were dropped onto the surface (evaluation surface) of the test piece at a flow rate of 2 mL/min, and the number of days of generation of white rust and red rust was evaluated. The droplet was dropped from 10 mm above the evaluation surface. The test environment was atmospheric air, and the temperature was maintained at 25° C.

According to the number of days during which white rust and red rust were generated, water flow corrosion resistance was evaluated according to the following evaluation criteria.

Evaluation Criteria

AAA: White rust: more than 7 days and red rust: 120 days or more

AA: <1> white rust: more than 7 days and red rust: 30 days or more and less than 120 days, or <2> white rust: 5 to 7 days and red rust: more than 60 days A: White rust: 5 to 7 days and red rust: 30 to 60 days B: <1> red rust: less than 30 days, or <2> white rust: less than 5 days The plated steel materials having the evaluation results of A to AAA were determined to be excellent in water flow corrosion resistance. In the evaluation B, the number of days during which red rust was generated was less than 30 days regardless of the number of days during which white rust was generated, or the number of days during which white rust was generated was less than 5 days regardless of the number of days during which red rust was generated, but such a plated steel material was determined to be a steel material inferior in water flow corrosion resistance. According to the above evaluation method, it can be determined that the plated steel material having high water flow corrosion resistance also has high flat portion corrosion resistance.

Table 3 indicates results.

TABLE 1

| | | | | Controlled cooling step | | | | |
| | | | | Bath temperature to Controlled cooling temperature | | | | Controlled cooling temperature to 70° C. | |
| No. | Ni adhesion content (g/m²) | Bath temperature (° C.) | Dew point (° C.) | Controlled cooling temperature (° C.) | Atmosphere gas | Average cooling rate (° C./s) | Dew point (° C.) | Average cooling rate (° C./s) |
|---|---|---|---|---|---|---|---|---|
| 1 | 0.0 | 460 | 0 | 320 | $N_2$ | 7 | −40 | 15 |
| 2 | 0.0 | 460 | 0 | 320 | $N_2$ | 7 | −40 | 20 |
| 3 | 1.5 | 460 | 0 | 320 | $N_2$ | 7 | −40 | 20 |
| 4 | 0.0 | 460 | 0 | 320 | $N_2$ | 4 | −40 | 20 |
| 5 | 0.0 | 460 | 0 | 320 | $N_2$ | 5 | −40 | 20 |

TABLE 1-continued

| | | | Controlled cooling step | | | | |
|---|---|---|---|---|---|---|---|
| | | | Bath temperature to Controlled cooling temperature | | | Controlled cooling temperature to 70° C. | |
| No. | Ni adhesion content (g/m$^2$) | Bath temperature (° C.) | Dew point (° C.) | Controlled cooling temperature (° C.) | Atmosphere gas | Average cooling rate (° C./s) | Dew point (° C.) | Average cooling rate (° C./s) |
|---|---|---|---|---|---|---|---|---|
| 6 | 0.0 | 460 | 0 | 300 | N$_2$ | 6 | −40 | 20 |
| 7 | 0.0 | 460 | 0 | 320 | N$_2$ | 6 | −40 | 20 |
| 8 | 0.1 | 420 | 0 | 320 | N$_2$ | 7 | −40 | 20 |
| 9 | 0.0 | 460 | 0 | 300 | N$_2$ | 7 | −40 | 20 |
| 10 | 0.0 | 460 | 0 | 320 | N$_2$ | 6 | −40 | 20 |
| 11 | 0.0 | 520 | 0 | 320 | N$_2$ | 4 | −40 | 20 |
| 12 | 0.0 | 520 | 0 | 330 | N$_2$ | 4 | −40 | 20 |
| 13 | 1.5 | 520 | 0 | 320 | N$_2$ | 4 | −40 | 20 |
| 14 | 0.0 | 520 | 0 | 320 | N$_2$ | 4 | −40 | 20 |
| 15 | 0.0 | 520 | 0 | 320 | N$_2$ | 4 | −40 | 20 |
| 16 | 1.5 | 520 | 0 | 320 | N$_2$ | 4 | −40 | 20 |
| 17 | 1.5 | 500 | 0 | 320 | N$_2$ | 4 | −40 | 20 |
| 18 | 1.5 | 520 | 0 | 320 | N$_2$ | 4 | −40 | 20 |
| 19 | 2.5 | 520 | 0 | 320 | N$_2$ | 4 | −40 | 20 |
| 20 | 1.5 | 680 | 0 | 320 | N$_2$ | 4 | −40 | 20 |
| 21 | 1.5 | 660 | 0 | 320 | N$_2$ | 4 | −40 | 20 |
| 22 | 1.5 | 530 | 0 | 320 | N$_2$ | 4 | −40 | 20 |
| 23 | 1.5 | 600 | 0 | 320 | N$_2$ | 4 | −40 | 20 |
| 24 | 1.5 | 600 | 0 | 320 | N$_2$ | 4 | −40 | 20 |
| 25 | 1.5 | 600 | 0 | 320 | N$_2$ | 4 | −40 | 20 |
| 26 | 1.5 | 600 | 0 | 320 | N$_2$ | 4 | −40 | 20 |
| 27 | 1.5 | 600 | 0 | 320 | N$_2$ | 4 | −40 | 20 |
| 28 | 0.0 | 660 | 0 | 320 | N$_2$ | 4 | −40 | 20 |
| 29 | 0.0 | 660 | 0 | 320 | N$_2$ | 4 | −40 | 20 |
| 30 | 1.5 | 680 | 0 | 330 | N$_2$ | 4 | −40 | 30 |
| 31 | 1.5 | 600 | 0 | 320 | N$_2$ | 4 | −30 | 20 |
| 32 | 0.0 | 460 | 0 | 330 | N$_2$ | 6 | −40 | 20 |
| 33 | 0.0 | 720 | 0 | 330 | N$_2$ | 6 | −40 | 20 |
| 34 | 0.0 | 460 | 0 | 320 | N$_2$ | 5 | −40 | 20 |
| 35 | 0.0 | 460 | 0 | 320 | N$_2$ | 6 | −40 | 20 |
| 36 | 0.0 | 420 | −30 | 320 | N$_2$ | 6 | −40 | 20 |
| 37 | 0.0 | 420 | Atmospheric air | 320 | Atmospheric air | 6 | −40 | 20 |
| 38 | 0.0 | 480 | 0 | 330 | N$_2$ | 8 | −40 | 20 |
| 39 | 0.0 | 480 | 0 | 310 | N$_2$ | 5 | −5 | 20 |
| 40 | 0.0 | 480 | 0 | 320 | N$_2$ | 7 | −40 | 11 |
| 41 | 0.0 | 420 | 0 | 360 | N$_2$ | 6 | −40 | 20 |

TABLE 2

| | Chemical composition of plated layer (Mass %, Remainder: Zn and Impurity) | | | | | | | |
|---|---|---|---|---|---|---|---|---|
| No. | Al | Mg | Si | Ca | Fe | Ni | | others |
| 1 | 1.0 | 1.1 | 0 | 0 | 0.1 | 0 | 0.001 | Li |
| 2 | 5.0 | 1.0 | 0 | 0 | 0.2 | 0 | 0.010 | Co |
| 3 | 8.0 | 2.6 | 0 | 0 | 0.2 | 0.200 | 0.005 | Bi |
| 4 | 10.0 | 2.9 | 0 | 0 | 0.2 | 0 | 0.080 | Sb |
| 5 | 10.0 | 3.8 | 0 | 0 | 0.2 | 0 | 0.080 | P |
| 6 | 12.2 | 4.0 | 0 | 0 | 0.3 | 0 | 0.050 | Sr |
| 7 | 12.0 | 4.3 | 0 | 0 | 0.2 | 0 | 0.060 | 0.050 Mn + 0.010 Cu |
| 8 | 12.0 | 5.1 | 0 | 0 | 0 | 0.100 | 0 | — |
| 9 | 14.0 | 5.2 | 0.1 | 0.1 | 0.3 | 0 | 0.050 | Pb |
| 10 | 15.0 | 5.0 | 0 | 0 | 0.3 | 0 | 0.001 | Ag |
| 11 | 15.1 | 5.2 | 0.1 | 0.1 | 0.1 | 0 | 0.005 | V |
| 12 | 19.5 | 6.2 | 0 | 0 | 0.3 | 0 | 0.003 | B |
| 13 | 19.0 | 5.9 | 0 | 0 | 0 | 0.200 | 0 | — |
| 14 | 18.9 | 5.9 | 0 | 0 | 0.3 | 0 | 0.010 | In |
| 15 | 19.2 | 5.6 | 0 | 0 | 0.2 | 0 | 0.050 | 0.010 In + 0.040 Sn |
| 16 | 18.8 | 7.0 | 0.1 | 0.1 | 0 | 0.200 | 0.020 | Nb |
| 17 | 18.9 | 6.9 | 0.1 | 0.2 | 0 | 0.200 | 0.010 | Zr |
| 18 | 20.0 | 7.8 | 0.1 | 0.1 | 0 | 0.200 | 0.010 | Sn |
| 19 | 20.2 | 8.0 | 0.2 | 0.1 | 0 | 0.500 | 0.200 | Cu |
| 20 | 20.3 | 15.0 | 0.5 | 2.0 | 0 | 0.100 | 0.020 | Pb |

TABLE 2-continued

| | Chemical composition of plated layer (Mass %, Remainder: Zn and Impurity) | | | | | | |
|---|---|---|---|---|---|---|---|
| No. | Al | Mg | Si | Ca | Fe | Ni | others |
| 21 | 25.0 | 13.7 | 0.5 | 0.2 | 0 | 0.200 | 0.010 Ti |
| 22 | 29.9 | 5.7 | 0.5 | 0.3 | 0 | 0.200 | 0.010 Mo |
| 23 | 36.0 | 6.6 | 0.8 | 0.4 | 0 | 0.300 | 0 — |
| 24 | 40.0 | 7.0 | 1.1 | 0.5 | 0 | 0.200 | 0.050 Cr |
| 25 | 49.5 | 7.0 | 1.2 | 0.5 | 0 | 0.200 | 0.010 Mn |
| 26 | 50.0 | 6.9 | 1.5 | 0.5 | 0 | 0.300 | 0.020 Y |
| 27 | 52.0 | 6.9 | 1.6 | 0.5 | 0 | 0.200 | 0 — |
| 28 | 54.6 | 1.9 | 1.6 | 0.5 | 2.0 | 0 | 0.010 La |
| 29 | 53.4 | 2.0 | 1.5 | 0.6 | 1.9 | 0 | 0.020 0.010 La + 0.010 Ce |
| 30 | 60.0 | 7.5 | 2.0 | 0.5 | 0 | 0.200 | 0.010 Ce |
| 31 | 38.5 | 6.6 | 1.0 | 0.5 | 0 | 0.200 | 0 — |
| 32 | 0.8 | 3.0 | 0 | 0 | 0.2 | 0 | 0 — |
| 33 | 63.0 | 2.0 | 2.0 | 0 | 1.8 | 0 | 0 — |
| 34 | 6.0 | 0.7 | 0.1 | 0 | 0.2 | 0 | 0 — |
| 35 | 6.8 | 21.0 | 0.1 | 0 | 0.2 | 0 | 0 — |
| 36 | 10.2 | 3.1 | 0 | 0 | 0.5 | 0 | 0 — |
| 37 | 10.0 | 3.0 | 0.1 | 0 | 0.2 | 0 | 0 — |
| 38 | 9.9 | 3.4 | 0.1 | 0.1 | 0.1 | 0 | 0 — |
| 39 | 10.1 | 2.8 | 0.1 | 0.1 | 0.1 | 0 | 0 — |
| 40 | 10.0 | 3.0 | 0.1 | 0.1 | 0.1 | 0 | 0 — |
| 41 | 10.5 | 3.0 | 0 | 0 | 0.4 | 0 | 0 — |

TABLE 3

| No. | Plated layer adhesion content g/m² | Oxide layer (Al + Mg)/Zn intensity ratio | Oxide layer Crystallinity | Oxide layer Thickness (nm) | Water flow corrosion resistance | Segment |
|---|---|---|---|---|---|---|
| 1 | 30 | 1.0 | Amorphous + Crystalline | 5 | A | Inventive Example |
| 2 | 90 | 1.1 | Amorphous + Crystalline | 10 | A | Inventive Example |
| 3 | 90 | 1.4 | Amorphous | 12 | AA | Inventive Example |
| 4 | 30 | 1.5 | Amorphous + Crystalline | 15 | AA | Inventive Example |
| 5 | 30 | 1.8 | Amorphous + Crystalline | 12 | A | Inventive Example |
| 6 | 30 | 2.2 | Amorphous + Crystalline | 14 | AA | Inventive Example |
| 7 | 30 | 2.2 | Amorphous + Crystalline | 14 | AA | Inventive Example |
| 8 | 90 | 2.0 | Amorphous | 14 | AAA | Inventive Example |
| 9 | 30 | 2.0 | Amorphous + Crystalline | 14 | AA | Inventive Example |
| 10 | 90 | 2.8 | Amorphous | 22 | AA | Inventive Example |
| 11 | 30 | 3.3 | Amorphous | 24 | AAA | Inventive Example |
| 12 | 90 | 3.0 | Amorphous | 25 | AAA | Inventive Example |
| 13 | 90 | 3.4 | Amorphous | 24 | AAA | Inventive Example |
| 14 | 90 | 4.3 | Amorphous | 25 | AAA | Inventive Example |
| 15 | 90 | 4.3 | Amorphous | 24 | AAA | Inventive Example |
| 16 | 90 | 4.5 | Amorphous | 25 | AAA | Inventive Example |
| 17 | 25 | 4.5 | Amorphous | 26 | AAA | Inventive Example |
| 18 | 15 | 4.4 | Amorphous | 22 | AAA | Inventive Example |
| 19 | 30 | 5.2 | Amorphous | 25 | AAA | Inventive Example |
| 20 | 250 | 3.3 | Amorphous | 24 | AAA | Inventive Example |
| 21 | 90 | 5.5 | Amorphous | 22 | AAA | Inventive Example |

TABLE 3-continued

| No. | Plated layer adhesion content g/m² | Oxide layer (Al + Mg)/Zn intensity ratio | Crystallinity | Thickness (nm) | Water flow corrosion resistance | Segment |
|---|---|---|---|---|---|---|
| 22 | 90 | 6.0 | Amorphous | 21 | AAA | Inventive Example |
| 23 | 30 | 4.4 | Amorphous | 22 | AAA | Inventive Example |
| 24 | 90 | 4.1 | Amorphous | 23 | AAA | Inventive Example |
| 25 | 90 | 3.3 | Amorphous + Crystalline | 22 | AA | Inventive Example |
| 26 | 45 | 3.1 | Amorphous + Crystalline | 20 | AA | Inventive Example |
| 27 | 90 | 3.0 | Amorphous + Crystalline | 23 | AA | Inventive Example |
| 28 | 30 | 1.6 | Amorphous + Crystalline | 24 | AA | Inventive Example |
| 29 | 30 | 1.5 | Amorphous + Crystalline | 23 | AA | Inventive Example |
| 30 | 50 | 3.0 | Amorphous + Crystalline | 30 | AA | Inventive Example |
| 31 | 90 | 3.8 | Amorphous | 22 | AAA | Inventive Example |
| 32 | 90 | 0.1 | Crystalline | 6 | B | Comparative Example |
| 33 | 90 | 4.4 | Crystalline | 12 | B | Comparative Example |
| 34 | 90 | 0.1 | Crystalline | 12 | B | Comparative Example |
| 35 | | | Plating is not possible | | | Comparative Example |
| 36 | 90 | 0.1 | Amorphous + Crystalline | 4 | B | Comparative Example |
| 37 | 90 | 1.2 | Crystalline | 8 | B | Comparative Example |
| 38 | 90 | 1.2 | Crystalline | 8 | B | Comparative Example |
| 39 | 90 | 1.2 | Crystalline | 7 | B | Comparative Example |
| 40 | 90 | 1.2 | Crystalline | 8 | B | Comparative Example |
| 41 | 90 | 1.1 | Crystalline | 5 | B | Comparative Example |

As can be seen from Tables 1 to 3, in Inventive Example Nos. 1 to 31, excellent water flow corrosion resistance was obtained. On the other hand, in Comparative Example Nos. 32 to 41, the chemical composition of the plated layer or the cooling condition in the controlled cooling step was out of the preferable range, so that water flow corrosion resistance was reduced.

INDUSTRIAL APPLICABILITY

The Zn—Al—Mg-based hot-dip plated steel member of the present disclosure is excellent in corrosion resistance and adhesion of the chemical conversion treatment layer, is also excellent in conductivity with the welding electrode even when the chemical conversion treatment layer is formed, and has an excellent external appearance in which defects are not easily noticeable, and thus has high industrial applicability.

REFERENCE SIGNS LIST

10 Photovoltaic power generation stand
11 Support column
12 Support member
20 Base structure

The invention claimed is:
1. A plated steel material comprising:
a steel sheet;
a plated layer formed on the steel sheet; and
an oxide layer formed on the plated layer,
wherein the plated layer has a chemical composition comprising, by mass %,
1.0 to 60.0% of Al,
1.0 to 15.0% of Mg,
0 to 2.0% of Si,
0 to 2.0% of Ca, and
0 to 2.0% of Fe,
and wherein the plated layer optionally contains one or more of:
0 to 1.000% of Ni,
0 to 0.500% of La,
0 to 0.500% of Ce,
0 to 0.500% of Sb,
0 to 0.500% of Pb,
0 to 0.500% of Sr,
0 to 0.500% of Bi,
0 to 1.000% of Sn,
0 to 1.000% of Cu,
0 to 1.000% of Ti,
0 to 1.000% of Mn,
0 to 1.000% of Cr,

0 to 1.000% of Nb,
0 to 1.000% of Zr,
0 to 1.000% of Mo,
0 to 1.000% of V,
0 to 1.000% of In,
0 to 1.000% of Co,
0 to 1.000% of Ag,
0 to 1.000% of Li,
0 to 0.500% of B,
0 to 0.500% of Y, and
0 to 0.500% of P, and
a remainder being of Zn and impurities,
wherein a total content of Ni, La, Ce, Sb, Pb, Sr, Bi, Sn, Cu, Ti, Mn, Cr, Nb, Zr, Mo, V, In, Co, Ag, Li, B, Y, and P in the plated layer is in a range of 0% to 5.000%,
the oxide layer has a thickness of 5 nm or more, and
a (Al+Mg)/Zn intensity ratio of the oxide layer, defined as a ratio of a sum of a maximum intensity of Al, in cps, in the oxide layer and a maximum intensity of Mg, in cps, in the oxide layer to a maximum intensity of Zn, in cps, in the oxide layer is 1.0 or more, wherein the maximum intensity of Al, the maximum intensity of Mg, and the maximum intensity of Zn are each obtained from energy dispersive X-ray (EDS) analysis of the oxide layer, and
the oxide layer includes an amorphous microstructure,
wherein the (Al+Mg)/Zn intensity ratio of the oxide layer is calculated by a method comprising:
obtaining a 10 μm square sample from the plated steel material, the sample including a cross section of the oxide layer along a sheet thickness direction;
observing the sample with a transmission-type electron microscope (TEM) equipped with an energy dispersive X-ray analyzer at a probe diameter of an electron beam of 3 nm and an irradiation current of 1.0 nA;
performing the energy-dispersive X-ray analysis at five points every 2 μm in a direction along the sheet surface;
determining the maximum intensity of Zn, the maximum intensity of Al, and the maximum intensity of Mg based on energy-dispersive X-ray analysis results;
calculating a ratio of a total of the maximum intensity of Al and the maximum intensity of Mg to the maximum intensity of Zn, wherein intensity ratios are determined at each of the five points, and an average thereof is defined as the (Al+Mg)/Zn intensity ratio of the oxide layer;
wherein the energy-dispersive X-ray analysis is performed under the following conditions:
an observation position by TEM is a ½ thickness position in the cross section of the oxide layer;
an acceleration voltage at a time of observation is 200 kV; and
an electron beam irradiation time lasts until a maximum peak intensity in a spectrum obtained by the energy-dispersive X-ray analysis becomes 2000 counts or more.

2. The plated steel material according to claim 1,
wherein the chemical composition of the plated layer contains, by mass %, one or more of:
0.1 to 2.0% of Si,
0.1 to 2.0% of Ca,
0.1 to 2.0% of Fe,
0.001 to 1.000% of Ni,
0.010 to 0.500% of La,
0.010 to 0.500% of Ce,
0.001 to 0.500% of Sb,
0.001 to 0.500% of Pb,
0.001 to 0.500% of Sr,
0.001 to 0.500% of Bi,
0.050 to 1.000% of Sn,
0.001 to 1.000% of Cu,
0.001 to 1.000% of Ti,
0.001 to 1.000% of Mn,
0.001 to 1.000% of Cr,
0.001 to 1.000% of Nb,
0.001 to 1.000% of Zr,
0.001 to 1.000% of Mo,
0.001 to 1.000% of V,
0.001 to 1.000% of In,
0.001 to 1.000% of Co,
0.001 to 1.000% of Ag,
0.001 to 1.000% of Li,
0.001 to 0.500% of B,
0.010 to 0.500% of Y, and
0.001 to 0.500% of P.

3. The plated steel material according to claim 2,
wherein in the chemical composition of the plated layer, the plated layer contains
10.0 to 30.0% of Al, and
4.0 to 15.0% of Mg,
and
the (Al+Mg)/Zn intensity ratio of the oxide layer is 2.0 or more.

4. The plated steel material according to claim 2,
wherein in the chemical composition of the plated layer, the plated layer contains
15.0 to 30.0% of Al, and
4.0 to 15.0% of Mg,
and
the (Al+Mg)/Zn intensity ratio of the oxide layer is 3.0 or more.

5. The plated steel material according to claim 2, wherein a diffraction spot indicating a crystalline microstructure is not detected in an electron beam diffraction image obtained by analyzing a cross section of the oxide layer along a steel sheet thickness direction using electron beam diffraction.

6. The plated steel material according to claim 1,
wherein in the chemical composition of the plated layer, the plated layer contains
10.0 to 30.0% of Al, and
4.0 to 15.0% of Mg,
and
the (Al+Mg)/Zn intensity ratio of the oxide layer is 2.0 or more.

7. The plated steel material according to claim 6, wherein a diffraction spot indicating a crystalline microstructure is not detected in an electron beam diffraction image obtained by analyzing a cross section of the oxide layer along a steel sheet thickness direction using electron beam diffraction.

8. The plated steel material according to claim 1,
wherein in the chemical composition of the plated layer, the plated layer contains
15.0 to 30.0% of Al, and
4.0 to 15.0% of Mg,
and
the (Al+Mg)/Zn intensity ratio of the oxide layer is 3.0 or more.

9. The plated steel material according to claim 8, wherein a diffraction spot indicating a crystalline microstructure is not detected in an electron beam diffraction image obtained by analyzing a cross section of the oxide layer along a steel sheet thickness direction using electron beam diffraction.

10. The plated steel material according to claim 1,
wherein a diffraction spot indicating a crystalline microstructure is not detected in an electron beam diffraction image obtained by analyzing a cross section of the oxide layer along a steel sheet thickness direction using electron beam diffraction.

11. A photovoltaic power generation stand comprising the plated steel material according to claim 1.

* * * * *